Patented Apr. 23, 1935

1,998,463

UNITED STATES PATENT OFFICE 1,998,463

PROCESS OF PREPARING CELLULOSE DERIVATIVES

James McGrath, Ardrossan, Scotland, assignor to Imperial Chemical Industries Limited, a corporation of Great Britain No Drawing. Application July 19, 1933, Serial No. 681,130. In Great Britain July 25, 1932

5 Claims. (Cl. 260—152)

This invention relates to the manufacture of cellulose ethers and more particularly the manufacture of aralkyl ethers of cellulose such as benzyl cellulose.

Amongst the many processes which have been proposed for the preparation of cellulose ethers one of the best known consists in first steeping the cellulosic material in a large excess of caustic soda solution of the so-called mercerizing strength, that is to say 15-20 per cent. concentration, and pressing out or otherwise removing the greater part of the excess caustic soda solution until the weight of the semi-moist cake of soda-cellulose is about 2.5 to 4 times the weight of the raw material. The semi-moist soda cellulose is then comminuted, e. g. by shredding, and is mixed with excess of solid caustic soda and with an etherifying agent, the latter being added either before or after the solid caustic soda, or alternately therewith in portions at a time. The temperature is then raised to allow the etherification to proceed.

It has also been proposed to incorporate cellulose directly with solid caustic soda, with or without added water, and then to add the etherifying agent, usually with subsequent incorporation of more solid caustic soda and etherifying agent, the temperature being raised to effect the etherification after each addition. The use of diluents such as toluol in such a process has also been proposed. Likewise it has been proposed to mix cellulose with water and an etherifying agent or solution thereof, then to add the full quantity of solid caustic soda required for the etherification, and then knead together, the temperature finally being raised to effect etherification.

In all the processes described above the time required to effect the whole process is considerable e. g. 16-24 hours at 100° C.

It has further been proposed to eliminate the use of solid caustic soda by treating the cellulose with the whole of the caustic soda required for the etherification in the form of a cold concentrated solution of considerably more than mercerizing strength, before or after addition of the etherifying agent, mixing, and raising the temperature. According to this method, however, it has not been found possible to realize the saving in time which might have been expected from the elimination of the use of solid caustic soda and the seeming simplicity of the process. This is partly due to the difficulty of soaking cellulose uniformly in a limited quantity of concentrated caustic soda solution, necessitating a long period of incorporation at this stage, and partly due to the fact that, independent of the quantity used, concentrated caustic soda solution has little or no swelling effect on the cellulose, so that the rate of etherification of the mixture is slow.

This invention has as an object the manufacture of cellulose ethers, and especially aralkyl ethers such as benzyl cellulose. A further object is a considerable reduction in the time required for the process of manufacture as a whole. A still further object is due economy in reagents. Other objects will appear hereinafter.

These objects are accomplished by the following invention wherein cellulosic raw material is mixed with the etherifying agent, with or without a diluent such as toluol, in the presence of a quantity of water at least sufficient to form a solution with the total amount of caustic soda subsequently added, the mixture thoroughly incorporated, and caustic soda in solid or dissolved state thereafter added in amount sufficient to form with the water present a solution of 15 to 25 per cent. concentration, the mixture thoroughly agitated and the solid caustic dissolved and then the remainder of the caustic soda required for the etherification added and thoroughly incorporated.

The initial mixture of cellulose, water and etherifying agent may be made by adding the water to a mixture of cellulose and the etherifying agent or by adding the etherifying agent to cellulose wetted with water, the whole being thoroughly mixed in a kneading or like machine. In the case of a very volatile etherifying agent it is advisable to use an organic diluent and to conduct the operations in a closed vessel, which is cooled until the etherification step is commenced. In the case of benzyl cellulose manufacture, however, the use of an organic diluent is unnecessary, and a closed vessel is not required, although during the etherification step the reaction vessel should be covered. To this initial mixture or slurry of cellulose, water and etherifying agent, caustic soda is added in amount sufficient to form with the water present, a solution of 15-25 per cent. Thereupon the mixture is kneaded for instance, in a machine of the Werner-Pfleiderer type for about a quarter of an hour. Thereupon, caustic soda in amount sufficient to complete the etherification, preferably in solid form, is added. The amount of caustic soda added should be that which will form with the water present a solution of 35-50 per cent. The minimum quantity depends partly on the concentration and partly on the amount of the caustic soda solution resulting from the first addition and of course will depend also on the degree of etherification required. The etherification does not proceed satisfactorily unless the final concentration of the caustic soda is about 35 per cent. or higher, and therefore in practice, the quantity of water is kept low, the amount used depending on the desired final concentration of caustic soda, and preferably not exceeding three times the weight of the cellulose. The caustic soda added should be enough to form a solution of 35–50 per cent. concentration with the water present which allows the formation of cellulose ethers soluble in the customary organic solvents. Instead of adding solid caustic soda in the second stage a cold concentrated solution containing the required amount may be added, provided that the concentration of the added solution is such that the final concentration of solution in the mass is within the prescribed limits. There is no objection to the temperature being allowed to rise during this stage even up to a temperature at which etherification can commence, provided that the diluent, if one is used, and the etherifying agent are not allowed to evaporate. After the incorporation of the second addition of caustic soda as above described, the whole is heated to a suitable temperature to allow the etherification to proceed, and the reaction mass is stirred until the reaction is over, the procedure for extracting the cellulose ether, thereafter presenting no new features.

The following examples illustrate the invention. The parts are by weight.

Example 1

100 parts of air-dry sulphite wood pulp are mixed with 300 parts of benzyl chloride, and 125 parts of water are added. These ingredients are mixed for one hour in a Werner-Pfleiderer incorporating machine. 31 parts of solid caustic soda are then added, the whole is mixed in the machine for a quarter of an hour, after which 94 parts of solid caustic soda are added, and mixing is continued for a further quarter of an hour, by which time the solid soda will be found to have been dissolved. The temperature is then raised to 100° C. and the mixture is maintained at that temperature for eight hours, stirring being kept up continuously.

When the reaction mass is treated and purified in known manner there is obtained a benzyl cellulose completely soluble in a mixture of 80 per cent. toluene and 20 per cent. by volume methylated spirits. The viscosity of a 10 per cent. solution so prepared is usually about 2 to 6 c. g. s. units.

Example 2

100 parts of cellulose wetted with 232 parts of water are mixed with 300 parts benzyl chloride in a Werner-Pfleiderer incorporating machine for half an hour. 58 parts solid caustic soda are then added, and the whole is mixed in the machine for a quarter of an hour, after which 67 parts of solid caustic soda are added, and mixing is continued for a further quarter of an hour after which the temperature will be found to be about 50 C. and the solid will have dissolved. The remainder of the process is as in Example 1, but the product usually has a viscosity of about 10 to 20 c. g. s. units in a 10 per cent. solution in 80 per cent. toluene and 20 per cent. methylated spirits.

Although the process has been described in detail with regard to the preparation of benzyl cellulose, it is also applicable to the preparation of cellulose ethers in general. Ethers may thus be prepared from cellulose, alkali, and water with the following etherifying agents:

Ortho methylbenzyl chloride, beta phenylethyl chloride, para methylbenzyl chloride, methyl sulfate, ethyl sulfate, crotonyl chloride, allyl chloride, cinnamyl chloride, propyl bromide, alpha menaphthyl chloride, para chlorobenzyl chloride, cuminyl chloride, the aralkyl etherifying agents representing a preferred class of etherifying agents. Other known reactive diluents than toluol, such as benzol, xylol, chlorobenzene, and the like, may be employed.

The time taken for the whole etherification to be completed is considerably reduced as compared with the prior processes noted above, the period of kneading required in a machine of the Werner-Pfleiderer type being usually about a quarter of an hour subsequent to the first addition of caustic soda and a quarter to one-half an hour after the second addition. The considerable reduction in time as compared with the prior processes is attributed in part to the superior swelling action of the relatively dilute caustic soda solution first formed over that of materially stronger solutions, for example, those of 35 per cent. concentration and over. This superior swelling amounts to an activation, which in turn results in rapidity of reaction during the etherification step, and to economy of etherifying agent. Hitherto such activation has not been accomplished without a lengthy process or series of processes for incorporating the cellulose and the soda prior to the etherification step.

Another advantage of the process is that the cellulose material is more easily uniformly wetted with water than with caustic soda solutions so that on addition of solid caustic soda the latter is quickly and uniformly distributed throughout the mass. Still another advantage of the process is that the cellulose is largely protected by the etherifying agent or its solution in the organic diluent, from the deleterious action of the atmosphere when in presence of the soda solution. The etherifying agent or its solution in the diluent, also serves to absorb the heat of solution of the solid caustic soda to a large extent, thus rendering possible the preservation to a comparatively great extent in the cellulose ether of some of the excellent physical properties of such raw materials as cotton linters and sulfite cellulose wood pulp.

It is obvious that the physical and chemical properties of the products may be varied by varying the amounts of water and of caustic alkali used subject to the limits above indicated.

The cellulose ethers prepared by the process of the present invention are of use in the preparation of coating compositions, coated fabrics, plastics, safety glass interlayers, and the like.

As many apparent and widely different embodiments of this invention may be made without departing from the spirit thereof, it is to be understood that I do not limit myself to the foregoing examples or description except as indicated in the following claims.

I claim:

1. A process of preparing cellulose ethers, which comprises adding to a slurry comprising cellulose, water, and an etherifying agent, caustic alkali in amount sufficient to form a 15-25 per cent. solution with the water present, agitating the mixture after solution of the alkali, and completing the reaction by the addition of further alkali in amount sufficient to make with the water then present a 35-50 per cent. solution.

2. A process of preparing cellulose ethers, which comprises adding to an alkali-free slurry comprising cellulose, water, and etherifying agent, caustic alkali in amount sufficient to form a 15-25 per cent. solution with the water present, agitating the mixture after solution of the alkali, adding further alkali in amount sufficient to make with the water then present a 35-50 per cent. solution, and completing the reaction by further agitation at etherifying temperatures.

3. A process of preparing aralkyl ethers of cellulose, which comprises adding to an alkali-free slurry comprising cellulose, water, and aralkyl halide, caustic alkali in amount sufficient to form a 15-25 per cent. solution with the water present, agitating the mixture after solution of the alkali, adding further alkali in amount sufficient to make with the water then present a 35-50 per cent. solution, and completing the reaction by further agitation at etherifying temperatures.

4. A process of preparing benzyl cellulose, which comprises adding to an alkali-free slurry comprising cellulose, water, and benzyl halide, caustic alkali in amount sufficient to form a 15-25 per cent. solution with the water present, agitating the mixture after solution of the alkali, adding further alkali in amount sufficient to make with the water then present a 35-50 per cent. solution, and completing the reaction by further agitation at etherifying temperatures.

5. A process of preparing benzyl cellulose, which comprises adding to a slurry of approximately one part by weight of cellulose, three parts by weight of benzyl chloride and one and one-quarter to two and one-third parts by weight of water, solid caustic alkali in amount sufficient to make a 15-25 per cent. solution with the water present, agitating for approximately a quarter of an hour, adding caustic alkali in amount sufficient to make a solution of 35-50 per cent. concentration with the water then present, mixing until solution of the alkali is complete, raising the temperature to approximately 100°, and maintaining the reaction mixture at that temperature for approximately eight hours with agitation.

JAMES McGRATH.